United States Patent
Davies et al.

(10) Patent No.: US 7,480,996 B2
(45) Date of Patent: Jan. 27, 2009

(54) TRUCK PIVOT JOINT BEARING AND METHOD OF LUBRICATING

(75) Inventors: John W. Davies, Bellevue, WA (US); Robert W. Knievel, Redmond, WA (US); Morri Montazeri, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 9 days.

(21) Appl. No.: 11/831,421

(22) Filed: Jul. 31, 2007

(65) Prior Publication Data

US 2007/0269152 A1 Nov. 22, 2007

Related U.S. Application Data

(62) Division of application No. 09/939,240, filed on Aug. 24, 2001, now Pat. No. 7,264,398.

(51) Int. Cl.
*B21D 53/10* (2006.01)
*F16C 1/00* (2006.01)
*F16C 17/00* (2006.01)
*F16C 33/10* (2006.01)
*F16C 33/18* (2006.01)

(52) U.S. Cl. ............ 29/898.1; 29/898; 29/898.11; 29/898.13; 29/898.14; 384/13; 384/26; 384/300; 384/322; 244/103 R (58) Field of Classification Search .......... 29/898, 29/898.1, 898.11, 898.13–14; 244/103 R; 384/13, 25–26, 101, 213, 300, 322, 445
See application file for complete search history.

(56) References Cited

U.S. PATENT DOCUMENTS

| 3,929,396 A | 12/1975 | Orkin et al. |
| 3,945,695 A | 3/1976 | Speakman |
| 3,974,988 A | 8/1976 | Whitworth |
| 3,996,143 A | 12/1976 | Orkin et al. |
| 4,525,286 A | 6/1985 | Reick |
| 4,592,782 A * | 6/1986 | Davies ................. 75/253 |
| 4,775,709 A | 10/1988 | Chandrasekaran et al. |
| 4,985,161 A | 1/1991 | Tohzuka et al. |
| 5,009,520 A | 4/1991 | Takajo et al. |
| 5,328,273 A * | 7/1994 | Nonaka et al. ........... 384/206 |

(Continued)

OTHER PUBLICATIONS

*In Brief: Science and Technology Notes from Around Connecticut*, Available at http://www.ctcase.org/13_2/jul98briefs.html (visited Jul. 30, 2007 but including items dated Jul. 1998), From Case Reports, vol. 13, No. 2.

(Continued)

*Primary Examiner*—David P Bryant
*Assistant Examiner*—Alexander P Taousakis
(74) *Attorney, Agent, or Firm*—Alston & Bird LLP (57) ABSTRACT

A bearing assembly is disclosed having a pair of bearing members movable relative to one another. A space is defined between the bearing members, and a relatively thin coating of a greaseless, self-lubricating material is applied to the surface of at least one of the bearing members. A grease lubricant is disposed in the space defined between the bearing members such that both the grease lubricant and the greaseless material act to substantially lower the friction-generated heat that is encountered during operation.

18 Claims, 5 Drawing Sheets

U.S. PATENT DOCUMENTS

| | | | |
|---|---|---|---|
| 5,707,718 | A | 1/1998 | Matsukawa et al. |
| 5,964,499 | A | 10/1999 | Carter |
| 6,005,025 | A | 12/1999 | Bhatia et al. |
| 6,016,995 | A | 1/2000 | Squires et al. |
| 6,086,257 | A | 7/2000 | Lee |
| 6,280,095 | B1 | 8/2001 | Furukoshi et al. |
| 6,296,393 | B1 | 10/2001 | Yabe et al. |
| 6,409,121 | B1 | 6/2002 | Lindahl |
| 6,474,870 | B1 | 11/2002 | Ni |
| 6,490,137 | B1 | 12/2002 | Toyota et al. |
| 6,729,763 | B2 | 5/2004 | Post et al. |
| 2001/0031596 | A1 * | 10/2001 | McDonald et al. .......... 442/389 |

OTHER PUBLICATIONS

*KAron and KAtherm Bearings*, Kamatics Corporation, Available at http://www.kamatics.com/karonpage1.html (visited Jul. 30, 2007 but Copyright 2003).

*KAron Bearings and Coatings-Typical Applications*, Kamatics Corporation, Available at http://www.kamatics.com/karonpage2.html (visited Jul. 30, 2007 but Copyright 2003).

\* cited by examiner

TRUCK PIVOT JOINT BEARING AND METHOD OF LUBRICATING

CROSS REFERENCE TO RELATED APPLICATION

The present application is a divisional of U.S. patent application Ser. No. 09/939,240, filed Aug. 24, 2001 now U.S. Pat. No. 7,264,398 and entitled Truck Pivot Joint Bearing and Method of Lubricating, the contents of which are incorporated herein in their entirety.

FIELD OF THE INVENTION

The present invention relates to bearing assemblies, and more particularly to bearing assemblies having two bearing members movable relative to one another and methods of lubricating these assemblies.

BACKGROUND OF THE INVENTION

Various bearing assemblies and methods of lubricating these assemblies can be found in many applications. Typical bearing assemblies include a pair of bearing members that are movable relative to one another. More specifically, a bearing or bushing is typically a cylindrical shell, with or without a flange, installed in a structural housing in conjunction with a mating shaft, pin, or bolt. Bearings having pinned joints typically are used for cyclic and oscillatory motion, such as used in landing gear joints, control surface hinge points, and actuating linkages.

The advantages of bearings are numerous. Bearings are relatively economical replacement elements which extend the useful life of major structural elements by providing protection from wear, corrosion, deformation, and other service-limiting or failure-initiating damage. The two basic considerations for successful service performance of a bearing are strength and life. Strength is the capability of the bearing to resist deformation and structural failure under static load. The life of the bearing is determined by its ability to resist wear, fretting, galling, and seizure under cyclic or oscillating motion.

Figure 1A:
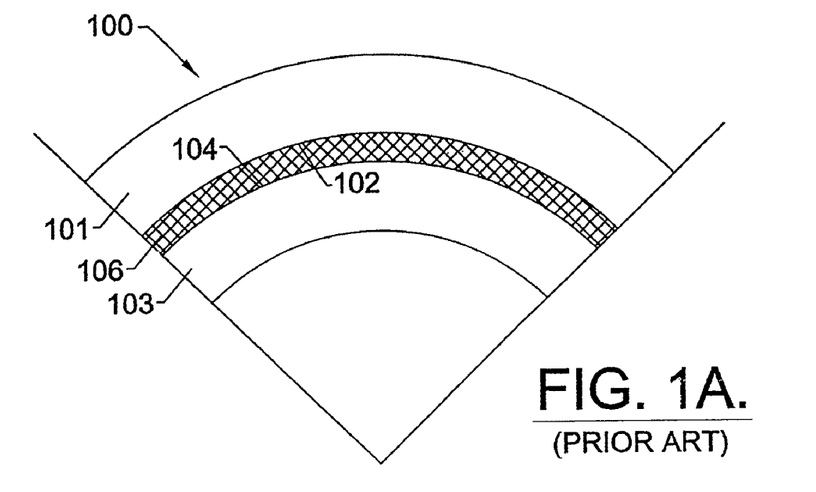
FIGS. 1A and 1B are cross-sectional views of a bearing assembly according to the prior art.

FIG. 1A shows a typical bearing structure assembly 100, wherein grease 106, such as Royal MS 11 manufactured by Royal Lubricants, Inc. of East Hanover, N.J., is applied between bearing assembly members comprising a bearing 101 and pin 103 to lubricate the members as they move relative to one another. Specifically, the grease 106 is disposed between the inner surface 102 of the bearing 101 and the outer surface 104 of the pin 103. While grease is suitable for many applications, extreme pressure and movement by the bearing assembly members may cause the grease to lose its lubricity, which may lead to overheating and eventual failure of the bearing assembly and surrounding structures.

Figure 1B:
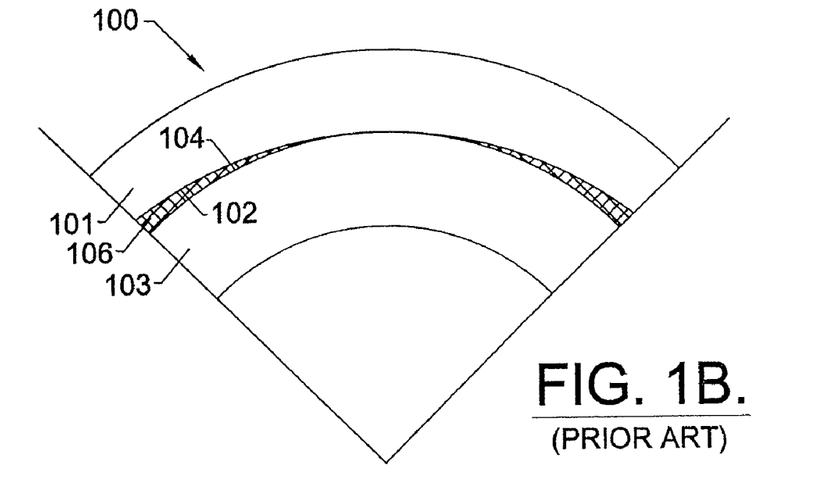

One application where this may occur is on a landing gear apparatus of an aircraft, and more particularly on a truck pivot joint bearing assemblies for an aircraft landing gear. The bearing assemblies used in this type of application typically include a relatively thick coating of grease between the moving surfaces of the bearing. This is acceptable for most circumstances because the dynamic bearing pressures and sliding velocities of the moving surfaces are relatively low. However, rough landing conditions, such as runways with deep cracks, crevices, potholes, and/or uneven surfaces, can cause excessive use of and wear on the truck pivot joint bearing assemblies from the rapid shocks and extreme oscillations these surface abnormalities transfer to the bearing assemblies. In some cases, it has been discovered that these rough conditions create as much as ten (10) times more energy than is generated under normal conditions. This additional energy is absorbed as heat by the bearing assemblies, which accounts for the damage that occurs when using conventional bearing assemblies in these environments. As a result, the high temperatures generated in these conditions cause the grease packed between the moving surfaces of the bearing assemblies to melt away and thus lose its effective lubricity. This is shown in FIG. 1B, wherein the grease 106 is no longer occupying the entire space between the opposing bearing members 101, 103, which allows the inner surface 102 of the bearing 101 to have intimate contact with the outer surface 104 of the pin 103.

As the grease loses lubricity and the surfaces 102, 104 of the bearing assembly 100 begin to directly move against each other, severe damage or failure of the bearing assembly components is likely. To prevent failure of the bearing assembly, time-consuming maintenance must be performed more frequently, which further adds to the cost of maintaining the aircraft in addition to the lost profits while the aircraft is under maintenance or repairs. Thus, it is desirable to provide a lubricant to bearing components that is more resistant to dynamic bearing pressures and heat generation in extreme conditions.

Figure 2A:
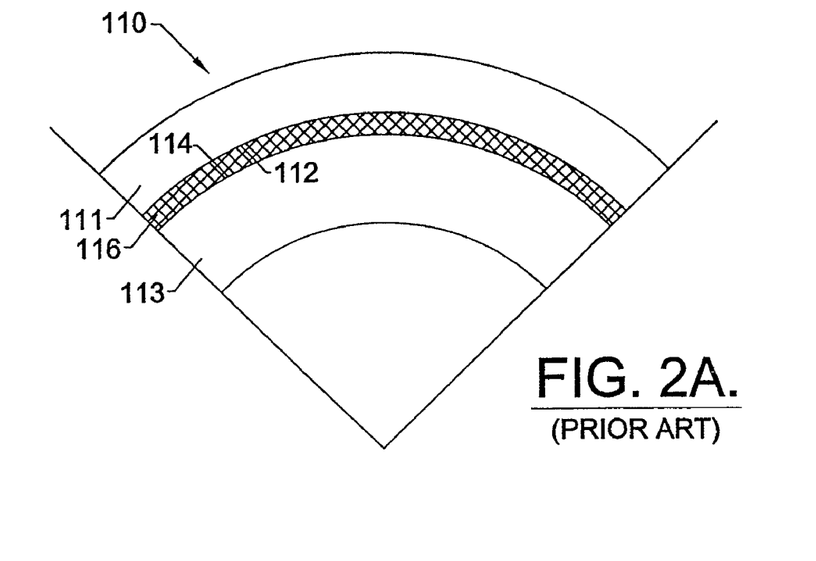
FIGS. 2A and 2B are cross-sectional views of a bearing assembly according to the prior art.

FIG. 2A shows another type of conventional bearing assembly. In particular, the bearing assembly 110 includes a bearing 111 and a pin 113 having opposing surfaces 112 and 114, respectively. A dry, greaseless coating material 116 is applied to a desired surface by spraying or coating the surface, such as the inner surface 114 of the bearing 111. The greaseless, self-lubricating material 116 occupies the space between the opposing bearing surfaces 112, 114 such that the surfaces are only separated by the greaseless material. One example of a greaseless self-lubricating material 116 is a polyester, thermosetting, resin-based material incorporating polytetrafluoroethylene or TEFLON® particles, such as the material manufactured under the name KARON by Kamatics Corporation of Bloomfield, Connecticut. This type of material is proclaimed as self-lubricating, meaning no external grease is required to lubricate the bearing assembly 110. Indeed, greaseless lubricants such as shown in FIG. 2 were designed to overcome the disadvantages of grease lubricants shown in FIG. 1, particularly in terms of load capacity and service life. Other types of greaseless lubricants are described in U.S. Pat. Nos. 3,929,396 and 3,996,143.

Figure 2B:
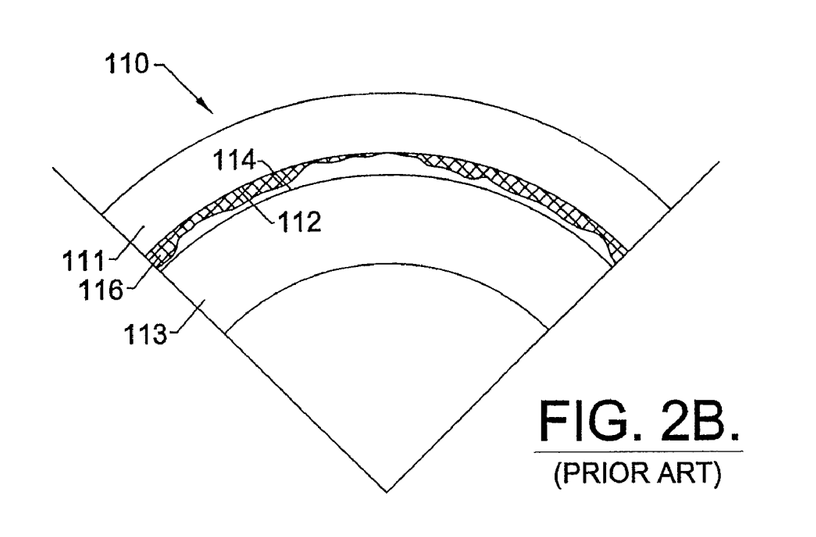
Figure 3:
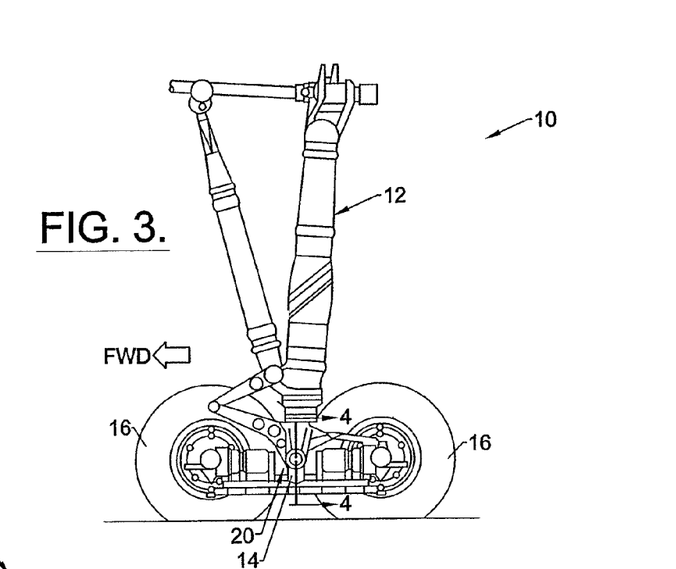
FIG. 3 is a side view of a landing gear assembly for an aircraft according to one embodiment of the present invention.

In particular, greaseless, self-lubricating materials operate at lower friction levels, which reduces the heat generated during operation. If heat does build up, the polytetrafluoroethylene particles typically expand more rapidly than the underlying surfaces to fill the space between the bearing surfaces, so that frictional contact between bearing surfaces 112, 114 is thwarted or delayed, at least temporarily. Conventional practice teaches that a thicker coating of the greaseless material 116 will provide more lubrication for the bearing 110. While true for most applications, the extreme loading conditions mentioned above may cause the greaseless material to break down. And because the greaseless material 116 allows the bearing surfaces 112, 114 to be essentially in contact with each other separated only by the greaseless lubricant, any reduction in the thickness of the greaseless lubricant can reopen the space between the bearing surfaces, which can damage the bearing or cause the bearing to fail. This is shown in FIG. 2B, wherein the greaseless material 116 has worn down in certain areas, which allows unwanted and damaging rattling or movement between the bearing assembly members 111, 113. Thus, while greaseless lubricants provide advantageous qualities over grease lubricants, there is a need to provide a bearing assembly having a lubricant that offers even better wear and heat resistance, which leads to longer operational life of the bearing. There is also a need to provide a bearing assembly having a lubricant that is resistant to extreme loading conditions, such that the lubricant provides longer protection to the bearing in these environments compared to protection from conventional lubricants before service is required.

SUMMARY OF THE INVENTION

These and other needs are provided, according to the present invention, by a bearing assembly that combines the benefits of greaseless lubricant materials and traditional grease lubricants to provide longer bearing lubrication and protection compared to conventional bearings and methods of lubricating the bearings. The bearing assembly of the present invention has been shown to provide up to 600% longer life than conventional grease-lubricated bearings under certain operating conditions, which greatly reduces the maintenance cost and frequency of the bearing.

In particular, the bearing assembly of the present invention comprises a pair of bearing members that are movable relative to one another. The members are typically metal, although other materials may also be used. In one embodiment, at least one of the members is formed of an aluminum, nickel, and bronze alloy, which is preferable because it has shown to be very durable and highly resistant to wear. In addition, the members are spaced a slight distance apart to define a space therebetween, such as between 0.006-0.008 inch. At least one of the bearing members has a bearing surface having a relatively thin coating of a self-lubricating, greaseless, polytetrafluoroethylene-based material thereupon. The coating, which according to one embodiment is about 0.003-0.007 inch, can be applied one of many ways, including spraying, coating, or dipping.

The thin coating of greaseless material does not occupy the entire space between the pair of bearing members. The remaining space is instead occupied by a grease lubricant. Accordingly, the grease lubricant and the greaseless lubricant act in conjunction with one another to lubricate the bearing members. Advantageously, it has been discovered that, despite the teachings that greaseless lubricant materials are not to be used in conjunction with grease lubricants, a dramatic improvement in bearing and lubrication life is realized by combining a relatively thin layer or coating of greaseless lubricant with a grease lubricant in the space defined by the bearing members.

The bearing assembly of the present invention is particularly advantageous for use in extreme conditions, such as where the bearing assembly is subjected to great dynamic pressures and oscillations. For example, truck pivot joint bearing assemblies used in aircraft landing gear are prime candidates for employing the teachings of the bearing assembly of the present invention, as truck pivot joint bearing assemblies may encounter great dynamic pressures and oscillations during landing cycles. Of course, the bearing assembly of the present invention can also be used in many other applications where the loading conditions are not extreme, as the longer lubrication and bearing life is appreciable in a broad range of applications.

Thus, the present invention provides a bearing assembly having an improved bearing life and requiring less frequent maintenance cycles to the bearing components. By combining the thin layer of greaseless material with a grease lubricant in the space defined between the two bearing members, at least two advantages are realized. First, the thin layer or coating of greaseless material provides a lower coefficient of friction compared to grease lubricants, which delays the onset of heat buildup and loss of lubricity. Second, the grease lubricant provides a less-rigid material for moving about and occupying the space between the bearing members, which further improves bearing life.

By contrast, using only a greaseless coating (i.e., a relatively thick coating as taught by conventional bearings) between the bearing members can result in unwanted play between the surfaces of the bearing assembly as the coating wears away. By using a relatively thin greaseless coating in conjunction with a grease lubricant, the greaseless lubricant receives little or no contact with the opposing bearing surface and thus wears more slowly. In addition, the grease lubricant fills the space between the bearing assembly surfaces to prevent unwanted movement or play. And because the thin greaseless coating reduces the friction and heat generated during loading cycles, the grease lubricant's life span is increased. Thus, the bearing assembly of the present invention provides a clear advantage over conventional bearing assemblies and lubrication techniques.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 3-6 show various views of portions of a landing gear assembly 10 for an aircraft, such as a Boeing 757. The landing gear assembly 10 includes at least one shock strut 12 that is rotatably connected to a truck pivot pin 24. Specifically, the shock strut 12 defines an opening for rotatably receiving the truck pivot pin 24. The shock strut 12 also includes a distal portion called an inner cylinder fork 26 that extends away from the opening. The landing gear assembly 10 also includes a truck pivot bearing assembly, shown generally as 20. The bearing assembly 20 includes a truck assembly 14 that is rotatably connected to the truck pivot pin 24, and at least two pairs of wheels 16 are attached to the truck assembly 14.

Figure 4:
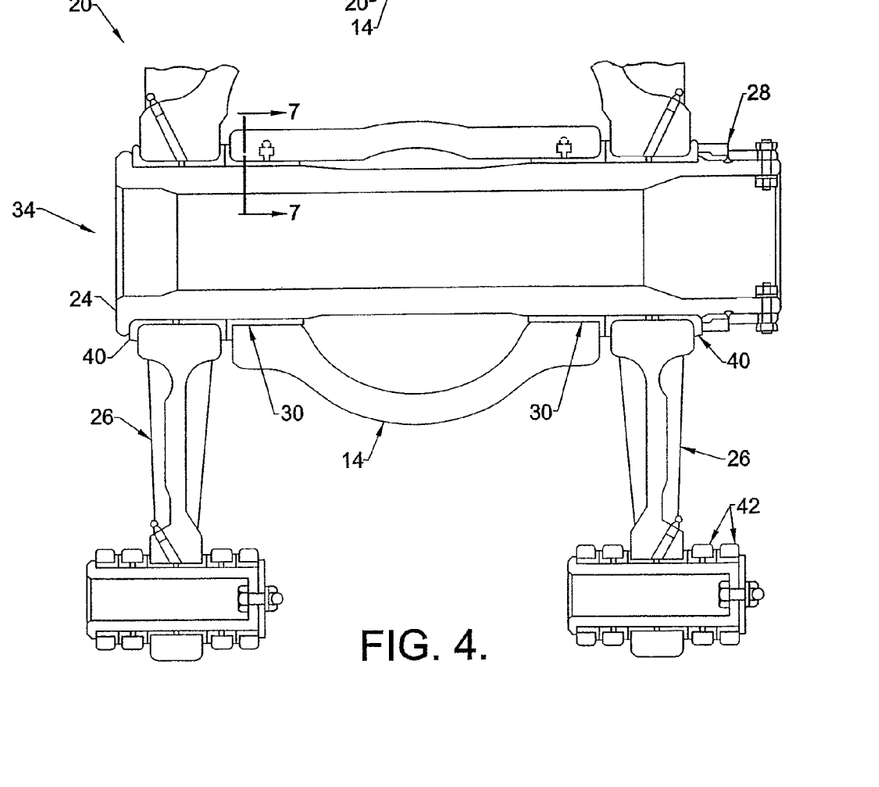
FIG. 4 is a cross-sectional view of a truck pivot joint bearing of the landing gear assembly as viewed along line 4-4 of FIG. 3.
Figure 6:
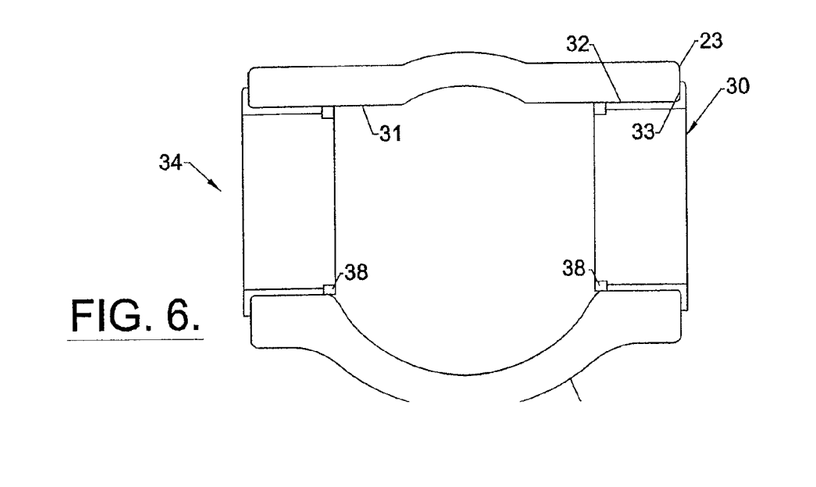
FIG. 6 is a cross-sectional view of a truck assembly according to one embodiment of the present invention.

FIGS. 4 and 6 show cross sectional views of the bearing 20, wherein FIG. 6 is a cross sectional view of the truck assembly 14 forming part of the bearing 20 shown in FIG. 4. As shown in FIG. 6, the truck assembly 14 defines a cavity 34 therethrough having an inner surface 31. The truck assembly 14 is preferably formed of metal, such as a high strength steel alloy, although other metals or materials may also be used, such as titanium. The truck pivot pin 24, which in one embodiment is a chrome plated pin, extends through the cavity 34 of the truck assembly 14. A pair of truck pivot bushings 30 are positioned at opposing ends of the truck assembly 14 such that flanged surfaces 33 of the pivot bushings engage sidewalls 23 of the truck assembly. In addition, a pair of back-to-back inner cylinder pivot bushings 40 are positioned proximate the inner cylinder forks 26 such that the inner cylinder assemblies are separated from the truck assembly 14 by the pivot bushing 30 and the inner cylinder pivot bushings 40. In this regard, the truck pivot bushings 30 and inner cylinder pivot bushings 40 provide low-friction support to the truck pivot pin 24 as it rotates inside the truck assembly 14 and shock struts 12. A splined washer 28 helps secure the inner cylinder pivot bushings 40 about the pivot pin 24, and multiple pairs of brake rods 42 extend substantially parallel to the truck assembly 14.

Figure 5:
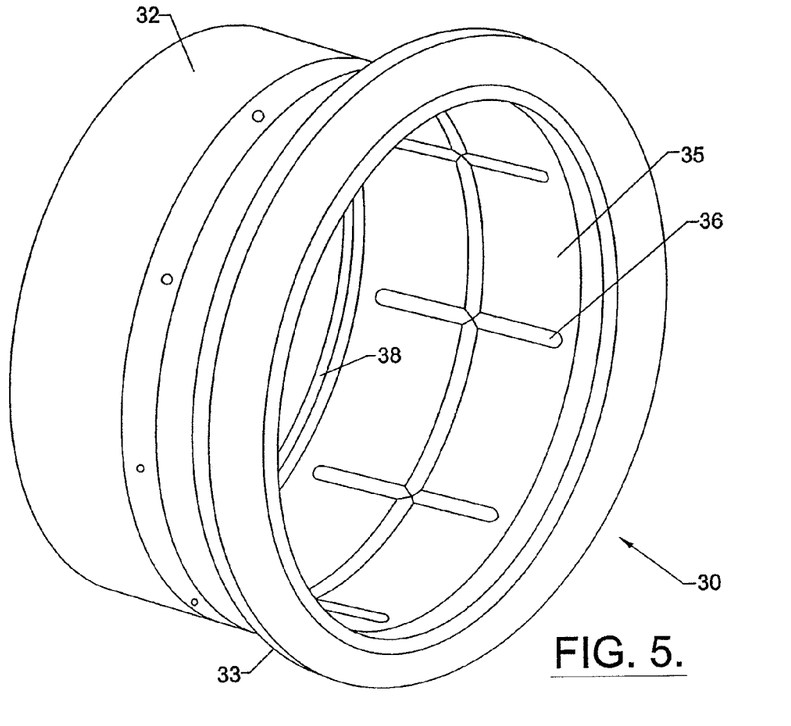
FIG. 5 is a side perspective view of a truck pivot bushing according to one embodiment of the present invention.

As shown in FIG. 4, the pivot bushings 30 are interposed between the truck assembly 14 and the truck pivot pin 24. As shown in FIG. 5, each pivot bushing 30 is generally tubular, and preferably defines a plurality of lubrication distribution grooves 36 that receive and distribute grease between the truck pivot pin 24 and the pivot bushings 30 so that the pivot pin 24 is rotatable relative to the truck assembly 14. Each pivot bushing 30 also includes an outer surface 32 that is positioned proximate the inner surface 31 of the truck assembly 14 in a press-fit or interference fit so that the pivot bushing 30 does not move relative to the truck assembly 14. A seal 38 is disposed proximate the lubrication distribution grooves 36 such that grease or other lubricant is prevented from escaping. According to one embodiment, the seal 38 is formed from an elastomer, although other materials could also be used to form the seal. As shown, each pivot bushing 30 engages a sidewall 23 of the truck assembly 14 and an adjacent inner cylinder pivot bushing 40 to further seal the pivot bushing and the truck assembly 14.

Figure 7:
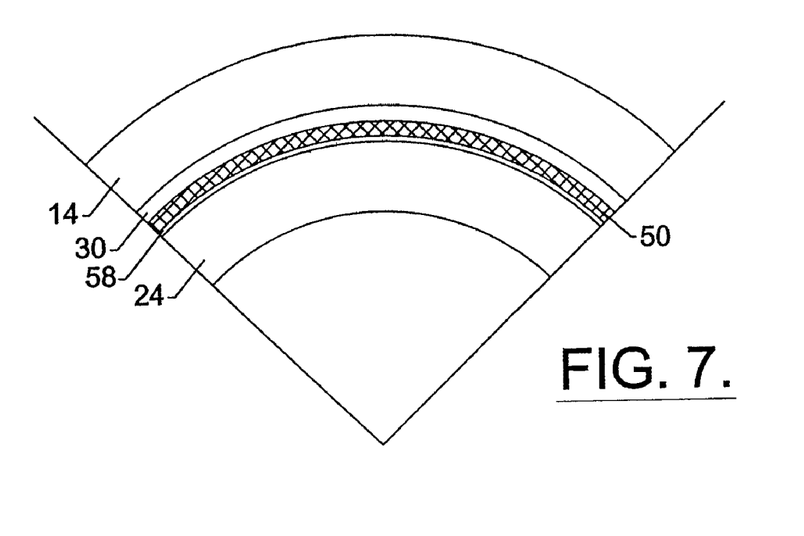
FIG. 7 is a cross-sectional view of a bearing assembly as viewed along line 7-7 of FIG. 4.

FIG. 7 shows a detailed cross-sectional view of the truck assembly 14, pivot bushing 30, and pivot pin 24 according to a preferred embodiment of the present invention. In particular, the pivot bushing 30 is disposed radially inwardly of the truck assembly 14 and is secured thereto by a frictional interference fit. The inner surface 35 of the pivot bushing 30 is proximate the pivot pin 24, and an advantageous lubricant according to the present invention is interposed therebetween. According to one embodiment, the inner surface 35 of the pivot bushing 30 is coated with a greaseless, self-lubricating material 50. It is also possible to apply the relatively thin coating of greaseless material 50 on both the inner surface 35 of the pivot bushing 30 and the outer surface of the pivot pin 24. Alternatively, only the outer surface of the pivot pin 24 may be coated with the greaseless material 50, although preferably only the inner surface 35 of the pivot bushing 30 includes the greaseless material 50. The material 50 is preferably a polytetrafluoroethylene-based material, such as a material sold under the trade name KARON by Kamatics Corporation of Bloomfield, Connecticut. The greaseless material 50 can be applied to the inner surface 35 of the pivot bushing 30 in a number of ways, such as spraying, brushing on, or by dipping the pivot bushing 30 in a bath of the greaseless material. The greaseless material 50 includes a solid particulate, such as polytetrafluoroethylene or TEFLON®, that is embedded in a stabilizer material in the form of flocked, powdered, fibrous, flaked, beaded, or other forms. Other particulate materials may also be used, such as silver powder, lead powder, and the like. The greaseless material 50 has a thickness of about 0.003-0.007 inch, and preferably about 0.005 inch. As shown in FIG. 7, the thickness of the greaseless material 50 is not enough to substantially fill the space defined by the pivot bushing 30 and the pivot pin 24.

Advantageously, the space defined by the pivot bushing 30 and the pivot pin 24 not occupied by the greaseless material 50 is occupied or filled by a grease lubricant 58, such as an extreme pressure grease sold under the name ROYCO 11MS manufactured by Royal Lubricants, Inc. of East Hanover, N.J. Other types of greases may also be used, such as any extreme pressure grease that is apparent to one of skill in the art. The chosen grease must be highly resistant to extreme dynamic bearing pressures and temperatures.

The combination of a relatively thin coating of the greaseless material 50 coupled with the grease lubricant 58 as disclosed by the present invention flies in the face of conventional lubrication systems and methods. In this regard, it has been discovered that applying a relatively thin coating, such as about 0.005 inch, of the greaseless material 50 in combination with the grease lubricant that fills the remainder of the gap between the pivot bushing 30 and the pivot pin 24 allows dynamic bearing pressures to be increased dramatically to a level that approaches the allowable pressures for the base bearing material. More particularly, the relatively thin layer or coating of greaseless material 50 has a friction coefficient of only about 0.08, whereas grease lubricants have a friction coefficient of about 0.20. As discussed above, conventional applications of greaseless material coatings call for much thicker coatings, which has been discovered to limit their use at relatively low dynamic bearing pressures and sliding velocities. Accordingly, the bearing assembly 20 according to the present invention can operate longer under extreme conditions, such as when landing aircraft on very rough runways where the bearing receives severe oscillations and sliding velocities. Specifically, the bearing assembly 20 according to the present invention reduces the friction-generated heat sufficiently to substantially reduce or eliminate damage to the truck assembly 14 or inner cylinder assembly 26.

Another advantage of the bearing assembly 20 according to the present invention is that the combination of greaseless, self-lubricating material 50 and the grease lubricant 58 can be applied in existing bearing assemblies, such as those found in aircraft landing gear assemblies, without having to redesign the assemblies to handle the extreme conditions. Thus, existing aircraft landing gear can easily be retrofitted with the bearing assembly 20 of the present invention, which is significantly less expensive than redesigning a new type of landing gear assembly or bearing configuration. In addition, the bearing assembly 20 of the present invention requires less frequent maintenance compared to conventional bearings operating under similar conditions, which substantially reduces maintenance man hours, downtime, and overall operating costs. In fact, it has been discovered that up to a 600% improvement in life span is achieved in comparison to conventional grease-lubricated bearings by applying the bearing assembly 20 of the present invention to truck pivot joint bearings in large jet aircraft landing gear assemblies.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, the teachings of the present invention, namely a bearing assembly 20 having the relatively thin coating 50 of greaseless, self-lubricating material in combination with a grease lubricant 58 used in combination in the space defined between the inner and outer members of a bearing assembly, can be applied to many industries in addition to the aerospace industry where lower friction bearings are desired. In addition, the teachings of the present invention regarding the combination of a greaseless, self-lubricating material used in combination with a grease lubricant could be applied to a broad range of applications, including applying the combination to a nut and bolt combination, or similar applications. Although specific terms are employed herein, they are used in a generic and descriptive sense only and not for purposes of limitation.

That which is claimed:

1. A method of manufacturing a bearing assembly having a pair of bearing members movable relative to one another, the method comprising:
   applying a coating of a self-lubricating, greaseless, thermosetting resin material on a portion of a first member of the pair of bearing members, wherein the resin material includes solid particulates embedded in a stabilizer material, and wherein applying the coating comprises applying the coating such that the coating extends continuously along a bearing surface of the first member;
   positioning a second member of the pair of bearing members proximate the first member to define a space therebetween; and
   introducing a grease lubricant between the first member and the second member such that the grease lubricant substantially occupies the space defined therebetween while remaining separated from the bearing surface of the first member by the coating extending continusously therealong.

2. A method according to claim 1, wherein the grease lubricant introducing step includes introducing an extreme pressure grease.

3. A method according to claim 1, wherein the applying step includes coating the first member with a thermosetting polytetrafluoroethylene-based resin material.

4. A method according to claim 1, further comprising removing the bearing assembly from an aircraft landing gear before said applying step, whereby the greaseless material and the grease lubricant are retrofitted in existing aircraft landing gear.

5. A method according to claim 1, wherein the solid particulate is in the form selected from the group consisting of flocked, powdered, fibrous, flaked and beaded.

6. A method according to claim 1, wherein applying the coating further comprises applying the coating of the thermosetting resin material on the first member of the pair of bearing members to a thickness of 0.003-0.007 inch.

7. A method according to claim 1, wherein positioning a second member comprises positioning the second member of the pair of bearing members proximate the first member to define a space therebetween of between 0.006 inch and 0.008 inch.

8. A method according to claim 1, wherein the first member is formed from the group consisting of steel, titanium, aluminum, nickel and bronze.

9. A method according to claim 1, further comprising a seal positioned in the space defined between the first member and the second member.

10. A method of lubricating a bearing assembly having a pair of bearing members movable relative to one another, the method comprising:
    positioning the pair of bearing members proximate each other to define a space therebetween;
    applying a coating of a thermosetting polytetrafluoroethylene-based, greaseless resin material to at least a portion of a first one of the members of the pair of members, wherein the polytetrafluoroethylene-based resin material includes solid particulates embedded in a stabilizer material, and wherein applying the coating comprises applying the coating such that the coating extends continuously along a bearing surface of the first one of the members; and
    introducing a grease lubricant so as to occupy the space defined between the members, wherein the grease lubricant is in contact with the coating of greaseless material while remaining separated from the bearing surface of the first one of the members by the coating of the polytetrafluoroethylene-based resin material extending continuously therealong.

11. A method according to claim 10, further comprising removing the bearing assembly from an aircraft landing gear before said applying step, whereby the greaseless material and the grease lubricant are retrofitted in existing aircraft landing gear.

12. A method according to claim 10, wherein the coating comprises a self-lubricating material.

13. A method according to claim 10, wherein the grease lubricant introducing step includes introducing an extreme pressure grease.

14. A method according to claim 10, wherein the solid particulate is in the form selected from the group consisting of flocked, powdered, fibrous, flaked and beaded.

15. A method according to claim 10, wherein applying the coating further comprises applying the coating of the thermosetting polytetrafluoroethylene-based resin material on the first member of the pair of bearing members to a thickness of 0.003-0.007 inch.

16. A method according to claim 10, wherein positioning the pair of bearing members comprises positioning a second one of the pair of bearing members proximate the first one to define a space therebetween of between 0.006 inch and 0.008 inch.

17. A method according to claim 10, wherein the first one of the members is formed from the group consisting of steel, titanium, aluminum, nickel and bronze.

18. A method according to claim 10, further comprising a seal positioned in the space defined between the pair of bearing members.

* * * * *